US011333293B2

(12) United States Patent
Zwier et al.

(10) Patent No.: US 11,333,293 B2
(45) Date of Patent: May 17, 2022

(54) MOUNT SYSTEM FOR A MONITORING DEVICE (71) Applicant: ZEBRA TECHNOLOGIES CORPORATION, Lincolnshire, IL (US)

(72) Inventors: Thomas P. Zwier, Lake Zurich, IL (US); Michael R. Garross, Beach Park, IL (US); Jay J. Williams, Glenview, IL (US); Sean P. Sweeney, Inverness, IL (US); Neal A. Fritz, Twin Lakes, WI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/796,524

(22) Filed: Feb. 20, 2020

(65) Prior Publication Data
US 2021/0262607 A1  Aug. 26, 2021

(51) Int. Cl.
G08B 13/196  (2006.01)
F16M 11/06  (2006.01)
F16M 11/04  (2006.01)
F16M 13/02  (2006.01)

(52) U.S. Cl.
CPC ........... F16M 11/06 (2013.01); F16M 11/041 (2013.01); F16M 13/027 (2013.01); G08B 13/19632 (2013.01); F16M 2200/022 (2013.01)

(58) Field of Classification Search
CPC . F16M 11/06; F16M 13/027; G08B 13/19632
USPC ..................... 248/581, 610, 289.31, 323, 900
See application file for complete search history.

(56) References Cited

U.S. PATENT DOCUMENTS

| 3,736,417 | A | * | 5/1973 | Williams | ................ F21V 15/02 362/430 |
| 5,487,524 | A | * | 1/1996 | Bergetz | ................. F16F 15/085 248/343 |
| 5,730,410 | A | * | 3/1998 | Archambault | ..... F16M 11/2014 105/150 |
| 6,536,731 | B1 | | 3/2003 | Tegland | |

(Continued)

OTHER PUBLICATIONS

Amazon.com: Universal Projector Ceiling Mount, Multiple Adjustment Wall Projector Hanging Bracket, Extendable Video Projector Wall Mount Bracket for Mini Projector Camera [https://www.amazon.com/Wendry-Universal-Projector-Adjustable-Extendable/dp/B07ZJQBRM/ref=sr_1_3?keywords=hanging+ceiling+camera+mount&qid=1639719700&sr=8-3](1996-2021).

(Continued)

Primary Examiner — Bradley Duckworth (57) ABSTRACT

A mount system for a monitoring device is disclosed. The mount system may include an extension arm attached to a device structure for housing the monitoring device. The mount system may include an alignment cup coupled to a support structure, wherein the extension arm is received through a through hole in a base of the alignment cup, and an oblong fitting attached to the extension arm opposite the device structure, wherein the oblong fitting is complementarily shaped to be received within the alignment cup to be received within the alignment cup, such that when the oblong fitting is received within the alignment cup, the device structure is aligned into a monitoring location. The mount system may include a dampening component between the support structure and the extension arm to bias the device structure into the monitoring location.

19 Claims, 5 Drawing Sheets (56) References Cited

U.S. PATENT DOCUMENTS

| | | | |
|---|---|---|---|
| 7,883,067 B2* | 2/2011 | Walters | F16M 11/2085 |
| | | | 248/317 |
| 8,191,322 B2 | 6/2012 | Liestenfeltz et al. | |
| 9,322,509 B2* | 4/2016 | Newhouse | H04N 7/183 |
| 10,630,944 B2* | 4/2020 | Magal | G06K 9/00771 |
| 10,820,307 B2* | 10/2020 | Zhang | H04W 72/1284 |
| 2004/0041072 A1* | 3/2004 | Kringel | F16M 13/02 |
| | | | 248/584 |
| 2018/0094770 A1* | 4/2018 | Noval | F16M 11/24 |
| 2020/0014888 A1* | 1/2020 | Magal | G06K 9/6272 |
| 2021/0048041 A1* | 2/2021 | Gorali | F04D 29/601 |

OTHER PUBLICATIONS

Amazon.com: "FastSnail Wall Mount Compatible with Wyze Cam Pan & Wyze Cam Pan V2 & Wyze Cam Pan V3, Adjustable Indoor Outdoor Mount for WyzeCam Pan/Wyze Cam Outdoor/Wyze Cam V3 or Other Cam with Same Interface 2 Pack"[https://www.amazon.com/FastSnail-Adjustable-Security-Interface-Standard/dp/B07DLXWMCV/ref=sr_1_11?keywords=free%2Bhanging%2Bcamera%2Bmount&qid=1639719898& sr=8-11&th=1](1996-2021)..

* cited by examiner

MOUNT SYSTEM FOR A MONITORING DEVICE

FIELD OF THE DISCLOSURE

This disclosure relates generally to a mount system and, for example, to a mount system for a monitoring device.

BACKGROUND

A monitoring system typically includes a monitoring device mounted in a particular location to monitor an environment from a particular perspective. Such a monitoring device may include an monitoring device (e.g., a camera, a ranging sensor, and/or the like) that is configured to detect, identify, and/or monitor one or more objects within the environment that are within a field of view of the monitoring device. Correspondingly, the monitoring device may provide information (e.g., size, quantity, availability, shape, and/or the like) associated with the one or more objects to a backend system that processes the information to track characteristics of the objects and/or an operation associated with the objects.

DETAILED DESCRIPTION

The following detailed description of example implementations refers to the accompanying drawings. The same reference numbers in different drawings may identify the same or similar elements.

In some instances, a monitoring device may be configured to monitor an operation of an environment. The operation may involve one or more machines that are to move within, throughout, and/or near the environment. Under certain circumstances, the monitoring device is to be mounted in a position that can subject the monitoring device to a collision with one or more of the moving machines and/or with freight being transported or loaded by the one or more moving machines. For example, the monitoring device may have particular characteristics (e.g., specifications, capabilities, field of view, and/or the like) that require the monitoring device to be within and/or near a passageway of the moving machines (and/or individuals or other types of moving objects). In such cases, the monitoring device may frequently be jostled, bumped, pivoted, rotated, and/or the like, such that the field of view of the monitoring device is altered, thereby preventing the monitoring device from monitoring the desired environment.

While some monitoring devices can monitor a particular environment from a safe location that would not subject the monitoring device to such impacts, the safe location may be relatively far from the environment, requiring the monitoring device to have relatively enhanced resolutions, resulting in a relatively high amount of computing resources (e.g., processing resources, memory resources, and/or the like) be consumed to process information from the monitoring device. Furthermore, such a far distance can increase the quantity of interfering objects passing between the monitoring device and the environment that is to be monitored, which causes the monitoring device to, more frequently, provide false information associated with the environment and/or images that do not depict the environment.

Moreover, some monitoring devices can be mounted to motorized devices (e.g., mechanical apparatus fit with electric motors, hydraulic motors, and/or the like) that permit the monitoring devices to be removed from an impact zone when an impact is imminent. Such motorized devices and/or systems can require additional sensors and/or resources (e.g., hardware resources, computing resources, and/or the like) to detect a potential impact and/or control the motorized devices to reposition the monitoring devices into a desired position to monitor the environment.

According to some implementations described herein, a mount system is provided to passively (e.g., without a motorized device and/or using only non-motorized components) reposition and/or reorient a monitoring device after withstanding an impact or other type of external force. For example, the mount system may include one or more components to suspend the monitoring device within an impact zone associated with the environment, permit the monitoring device to move relative to a support structure, and return the monitoring device to a monitoring location that has a particular position and a particular orientation. The monitoring device can be included within a device structure that is suspended, by an extension arm, from the support structure. One or more components or couplings between the support structure, extension arm, and/or device structure, as described herein, may be configured to passively dampen movement (e.g., oscillation) of the monitoring device and/or passively realign the monitoring device with the environment. In this way, the mount system and/or a stabilization system described herein permits the monitoring device to be mounted within an impact zone associated with an environment, without requiring motorized devices.

Figure 1:
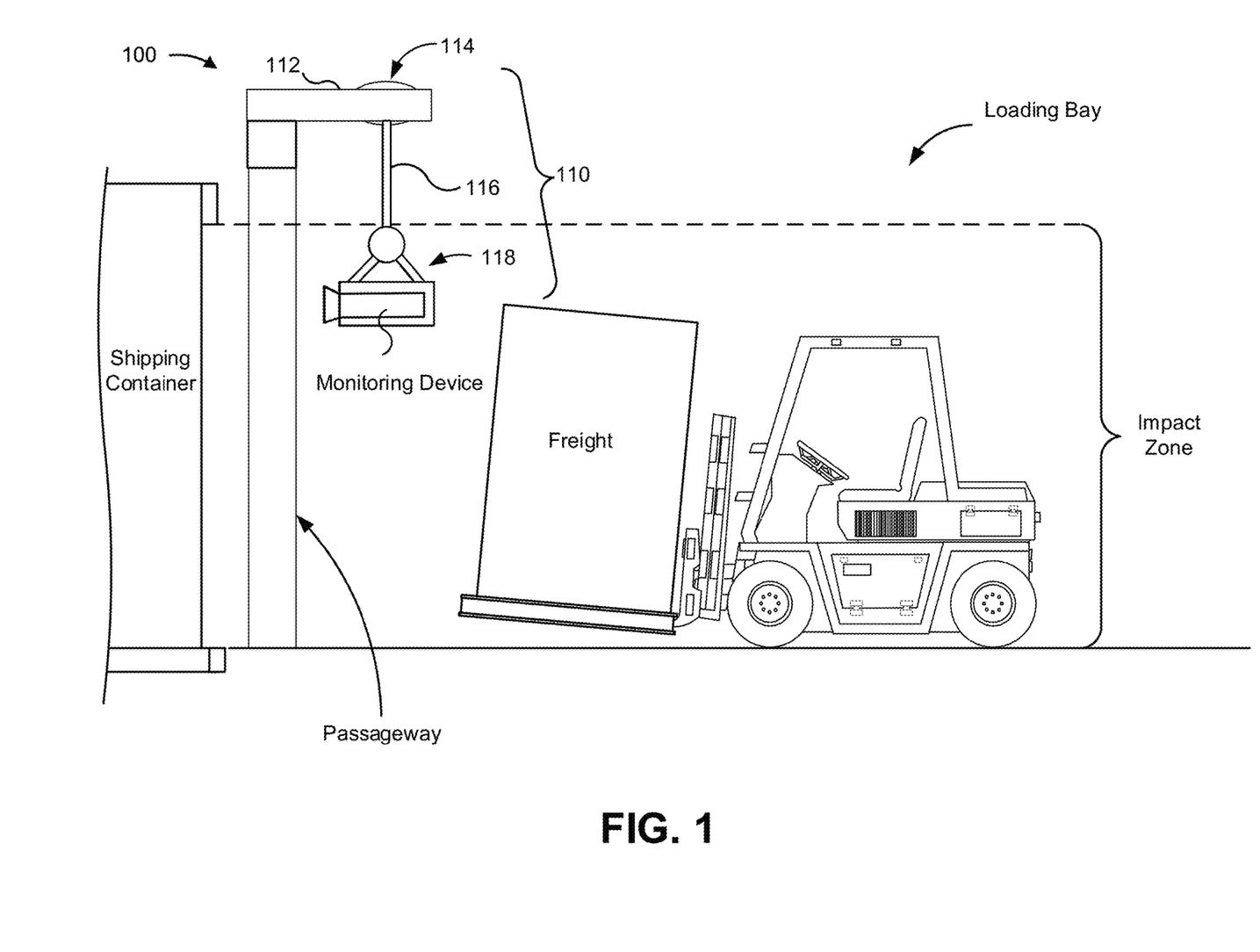
FIG. 1 is a diagram of one or more example implementations described herein.

FIG. 1 is a diagram of an example implementation 100 described herein. Example implementation 100 includes a monitoring device that is configured to monitor an example environment, shown as a container (e.g., a shipping container, a semi-trailer container or bed, and/or the like). For example, the monitoring device may provide images and/or information associated with the container and/or objects within the container, such as an available capacity of the container, a quantity of objects within the container, types of objects within the container, and/or the like. In example implementation 100, a loading machine (shown as and referred to herein as a "forklift") in a loading bay is to load/unload an object (shown as "freight") to/from the container. Further, during a loading operation and/or an unloading operation, the forklift may pass through a passageway (an opening through one or more doors of the loading bay and/or container) multiple times to add objects to or remove objects from the container, creating a high traffic zone of the loading bay. Although examples described in connection with example implementation 100 involve the loading bay, the container, and/or the forklift, other example environments and/or operations may similarly be monitored using example mount systems and/or monitoring devices described herein.

In example implementation 100, to detect and/or monitor the container, the monitoring device (e.g., a camera, an infrared sensor, a light detection and ranging sensor (LIDAR), and/or the like) is mounted in an impact zone of the loading bay (e.g., a high traffic zone where there is a likelihood of impact between the monitoring device and another object). For example, the impact zone may correspond to a three-dimensional space of the loading bay that is below an upper edge of a container door and aligns with dimensions and/or an axis of the passageway (e.g., a center axis). The monitoring device may be positioned within the impact zone within a certain distance of the container (e.g., within a certain distance of the passageway) according to the specifications of the monitoring device. For example, the monitoring device may have certain range capabilities, certain resolution capabilities, and/or the like. Accordingly, the monitoring device is to be placed within a distance of the container such that a full three-dimensional space can be monitored (or imaged) by the container (e.g., when the container is empty). As a more specific example, if the monitoring device has a maximum range, at a particular resolution, of approximately 20 meters (m), and the length of the container is 18 meters, the monitoring device is to be positioned within 2 meters of the passageway to permit the monitoring device to capture an image of the interior of the container, when empty, at that resolution. Accordingly, the position of the monitoring device, within the impact zone of example implementation 100, permits the monitoring device to accurately provide desired information associated with the container and/or objects within the container. However, as described herein, positioning the monitoring device in the impact zone of the loading bay can subject the monitoring device to likely, or even frequent, collisions with the freight, the forklift, and/or the like.

As shown in FIG. 1, a mount system 110 is used to mount the monitoring device (and/or device structure) within a monitoring location. The mount system 110 includes a support structure 112, an alignment coupling 114, an extension arm 116, and a device structure 118. As described herein, the monitoring location is a particular position (e.g., within a three-dimensional space of the impact zone) and a particular orientation (e.g., a particular direction or vector from the particular position) within and/or relative to the impact zone (and/or the passageway). For example, in example implementation 100, the particular position may be within a vertical plane that is between (e.g., centered between) planes that align with sides of the passageway and/or along a horizontal plane defined by the length of the extension arm 116 and/or dimensions of the device structure 118 (e.g., when the device structure 118 and/or extension arm 116 are at rest). Further, the particular orientation of the monitoring location may correspond to an orientation in which a field of view of the image sensor is focused along a monitoring axis of the device structure 118 toward a point (or area) of the container or passageway (e.g., an expected center of a far end of the container, an area corresponding to a far end of the container, an area of the passageway, and/or the like).

As shown in FIG. 1, the support structure 112 extends from a support of the passageway (e.g., corresponding to a wall and/or a beam of the loading bay). The alignment coupling 114 and the extension arm 116 permit the device structure 118 to pivotably move about the alignment coupling 114, which may correspond to a joint between the support structure 112 and the extension arm 116. As described herein, the alignment coupling 114 is configured (e.g., shaped) to cause the device structure to return to the monitoring location (to the particular position of the monitoring location and the particular orientation of the monitoring location) after an external force (e.g., a force associated with an impact caused by the forklift) is exerted and/or applied on the device structure 118 and/or the extension arm 116.

In some implementations, in order to absorb an impact (e.g., caused by the forklift and/or other object or individual), the device structure 118 may be surround with a bumper formed of a shock resistant material (e.g., a rubber material, a foam material, and/or the like). Furthermore, as described herein, the mount system 110 may include one or more dampening components to bias the device structure 118 back toward the monitoring location more quickly. In such a case, the monitoring device can be configured to continue to monitor the container (e.g., capture and/or provide images and/or information associated with the container or objects in the container) relatively more quickly, following a collision with freight being hauled by the forklift, the forklift, itself, and/or any other object.

In example implementation 100, the mount system 110 does not include any motorized devices to actively return the device structure 118 (and, thereby, the monitoring device) to the monitoring location. In other words, the mount system 110 is configured to passively (e.g., without a motorized device and/or using only non-motorized components) return the device structure 118 to the monitoring location. For example, components of the alignment coupling 114 may be shaped such that a gravitational force on the device structure 118 orients the monitoring device toward the passageway. Additionally, or alternatively, a mechanical dampener, such as a spring, a grommet, an o-ring, and/or other type of non-motorized (and/or non-powered) component (e.g., a component that has potential energy in a steady state) may bias the device structure back to the monitoring location (e.g., so that the extension arm is vertical or plumb).

As indicated above, FIG. 1 is provided merely as one or more examples. Other examples may differ from what is described with regard to FIG. 1.

Figure 2:
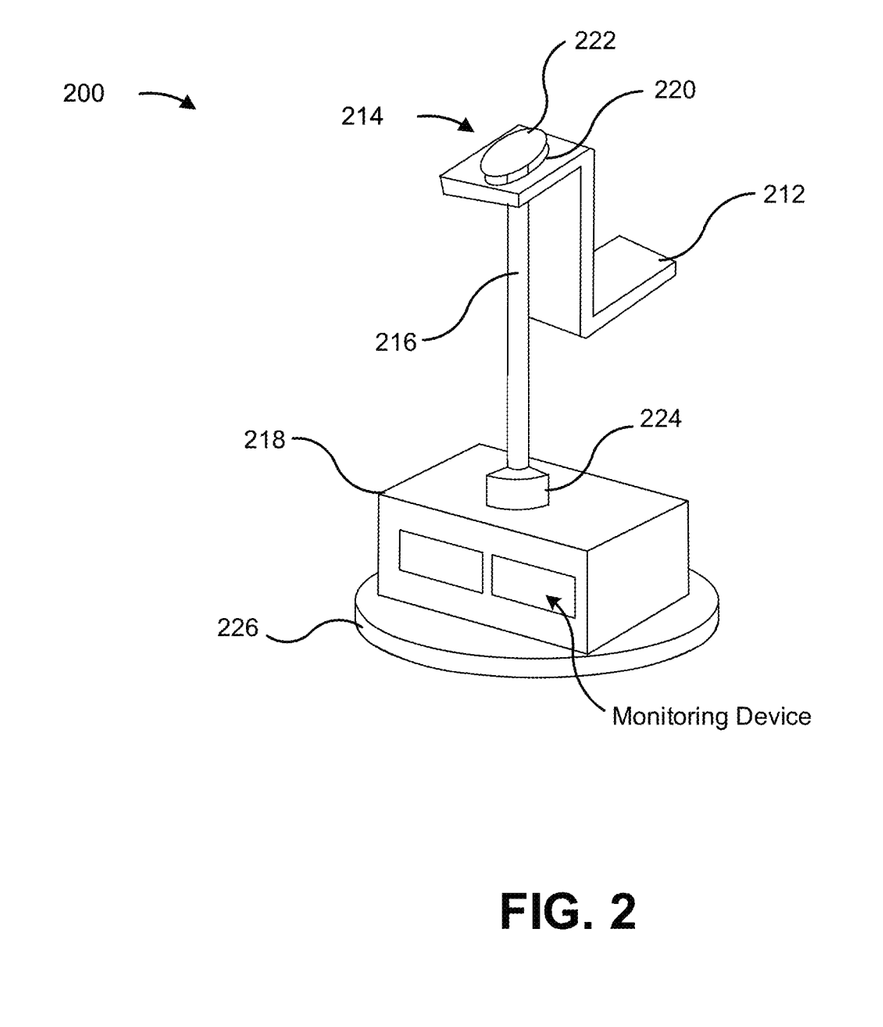
FIG. 2 is a diagram of an example implementation of a mount system described herein.

FIG. 2 is a diagram of an example implementation of a mount system 200 described herein. The mount system 200 may correspond to the mount system 110 of FIG. 1. As shown, the mount system 200 includes a support structure 212 (e.g., corresponding to the support structure 112 of FIG. 1), an alignment coupling 214 (e.g., corresponding to the alignment coupling 114 of FIG. 1), an extension arm 216 (e.g., corresponding to the extension arm 116 of FIG. 1), and a device structure 218 (e.g., corresponding to the device structure 118 of FIG. 1).

In FIG. 2, the alignment coupling 214 includes an alignment cup 220 within the support structure 212 and an oblong fitting 222 at an end (e.g., an upper end) of the extension arm 216. The alignment cup 220 may be a concave indentation with a through-hole at the base of the alignment cup 220 to permit the extension arm 216 to be received through the alignment cup 220 (e.g., during installation of the mount system 200 and/or assembly of the mount system 200). In some implementations, the oblong fitting 222 and/or the extension arm 216 may include a conduit to receive wiring associated with the monitoring device. For example, the extension arm 216 may be hollow so that the wiring can run between an monitoring device and another device (e.g., a power supply, a backend device, and/or the like) through the extension arm 216 and an opening in the oblong fitting 222. In this way, the extension arm 216 and/or the oblong fitting 222 may protect wiring that may be used to power and/or communicatively couple the monitoring device to another device.

As shown in FIG. 2, the device structure 218 includes a frame that is to house an monitoring device (not shown in FIG. 2). The device structure 218 may include any suitable opening to receive the monitoring device and/or to align with an aperture of the monitoring device to permit the monitoring device to capture images and/or obtain information associated with an environment as described herein. The device structure 218 is attached to (and/or suspended from) a lower end of the extension arm 116 via a coupling 224. The coupling 224 may be a fixed and/or rigid component to prevent the device structure 218 from rotating relative to the extension arm 216. In some implementations, the coupling 224 may include a pivotable component to permit the device structure 218 to pivot, relative to the extension arm 216, about the coupling 224 (e.g., in a fixed set of directions). Additionally, or alternatively, the coupling 224 may include a dampening component to bias an orientation of the device structure 218 to be perpendicular with the extension arm 216.

As further shown in the example of FIG. 2, the device structure 218 may include, be fit with, and/or be attached to a shock absorber 226, such as a rubber or foam bumper, to permit the device structure 218 (and correspondingly the mount system 200) to improve impact resistance and/or durability of the mount system 200. As shown, a perimeter of the shock absorber 226 may extend beyond a perimeter of the device structure 218 to reduce the possibility of the device structure 218 receiving a direct impact from an object (e.g., the forklift of FIG. 1).

As indicated above, FIG. 2 is provided merely as one or more examples. Other examples may differ from what is described with regard to FIG. 2.

Figure 3:
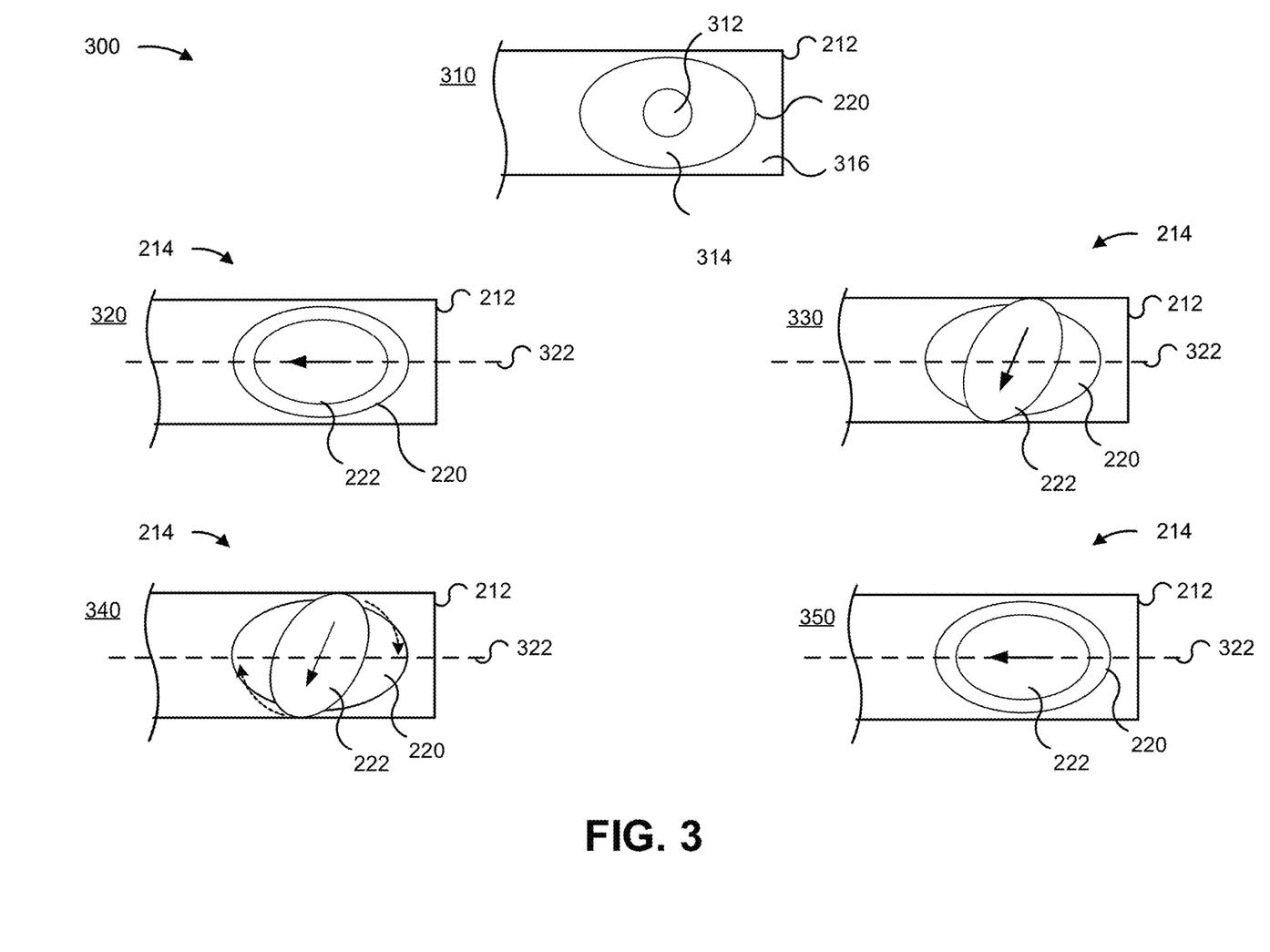
FIG. 3 is a diagram of an example implementation of an alignment coupling associated with the mount system of FIG. 2.

FIG. 3 is a diagram of an example implementation 300 associated with the mount system 200 of FIG. 2. In FIG. 3, top views of one or more components of the alignment coupling 214 of the mount system 200 are shown. As shown in FIG. 3 and by reference number 310, the alignment cup 220 is included within the support structure 212 and includes a through-hole 312 at the base of the alignment cup 220. Further, the alignment cup 220 has a receiving surface 314 of the alignment cup 220 that is between the through hole 312 and a top surface 316 of the support structure 212. The receiving surface 314 is configured to be in contact with the oblong fitting 222 when the oblong fitting 222 is received within the alignment cup 220 as described herein.

As shown in the example implementation 300 of FIG. 3, the alignment cup 220 and the oblong fitting 222 are similarly shaped to permit a portion of the oblong fitting 222 to be received within the alignment cup 220. For example, as shown by reference number 320, a portion of the oblong fitting 222 is to fit within the alignment cup 220 to orient the device structure 218 along a longitudinal axis 322 of the alignment cup 220 (e.g., which may correspond to a direction of the container relative to the monitoring device in FIG. 1). The longitudinal axis 322 may correspond to and/or be parallel to a monitoring axis of the device structure 218. For example, the longitudinal axis 322 and the monitoring axis of the device structure 218 may be in a same vertical plane. Correspondingly, a directional field of view of a monitoring device mounted to the device structure 218 is represented in example implementation 300 by the illustrated arrow on the oblong fitting 222.

The portion of the oblong fitting 222 that fits within the alignment cup 220 may correspond to a volume of the oblong fitting 222 that is defined by a horizontal plane through the oblong fitting 222 and a surface of the oblong fitting 222 that is between the horizontal plane and the extension arm 216. The horizontal plane may be perpendicular to the extension arm 216 and/or parallel to the top surface 316 that surrounds the alignment cup 220.

As shown by reference number 330, the oblong fitting 222 may rotate in a manner that causes the portion of the oblong fitting 222 to become dislodged from the alignment cup 220. In such a case, the field of view of an monitoring device of the device structure 218 is no longer aligned with a monitoring axis of a monitoring location of the device structure 218. For example, an external force (e.g., such as a horizontal impact, a vertical impact, a rotational force on the device structure 218) may cause the extension arm 216 to rotate and/or correspondingly lift the oblong fitting 222 from the alignment cup 220. When lifted from the alignment cup 220, the extension arm 216 may pivot about the alignment coupling 214 (e.g., about the through-hole 312). In this way, due to the external force and the alignment coupling 214, the device structure 218 may be moved from a monitoring location without damage to the mount system 200.

As further shown in FIG. 3, and by reference number 340, due to the shape of the oblong fitting 222, the corresponding shape of the alignment cup 220, and a gravitation force on the device structure 218, the oblong fitting 222 may passively reorient the device structure 218 by causing the extension arm 216 to correspondingly rotate the device structure 218. Accordingly, the extension arm 216 is to rotate the device structure 218 until the oblong fitting 222 is pulled back into the alignment cup 220, as shown by reference number 350, thereby returning the device structure 218 back to the monitoring location (and realigning the directional field of view of the monitoring device with the monitoring axis and/or longitudinal axis of the alignment cup 220).

According to some implementations, one or more biasing components can be included within the alignment coupling 214 to improve a response time associated with causing the oblong fitting 222 to be received within the alignment cup 220. For example, one or more magnets may be placed on or within the alignment cup 220 and/or the oblong fitting 222 to cause portions of the alignment cup 220 and/or oblong fitting 222 to be magnetically attracted to one another, thereby increasing the rate at which the oblong fitting 222 returns to being positioned within the alignment cup 220.

Though shown as having an ellipsoidal shape (and/or an ovular horizontal plane), the oblong fitting 222 and/or alignment cup 220 may be pyramidal (or triangular in a horizontal plane) and/or have any other shape that includes non-symmetrical portions to cause a gravitational force on the extension arm 216, the device structure 218, the oblong fitting 222, and/or the like to rotate the extension arm 216 until the oblong fitting 222 is aligned with the alignment cup 220 in a manner that permits a portion (e.g., at least 25% of a volume of the oblong fitting 222) of the oblong fitting 222 to be within the alignment cup 220 (e.g., beneath the top surface 316).

In this way, the oblong fitting 222 can be removed or dislodged from the alignment cup 220 to permit the extension arm 216 and/or the device structure to move, and, when the oblong fitting 222 is reset within the alignment cup 220, the device structure 218 is properly oriented within the monitoring location.

As indicated above, FIG. 3 is provided merely as one or more examples. Other examples may differ from what is described with regard to FIG. 3.

Figure 4:
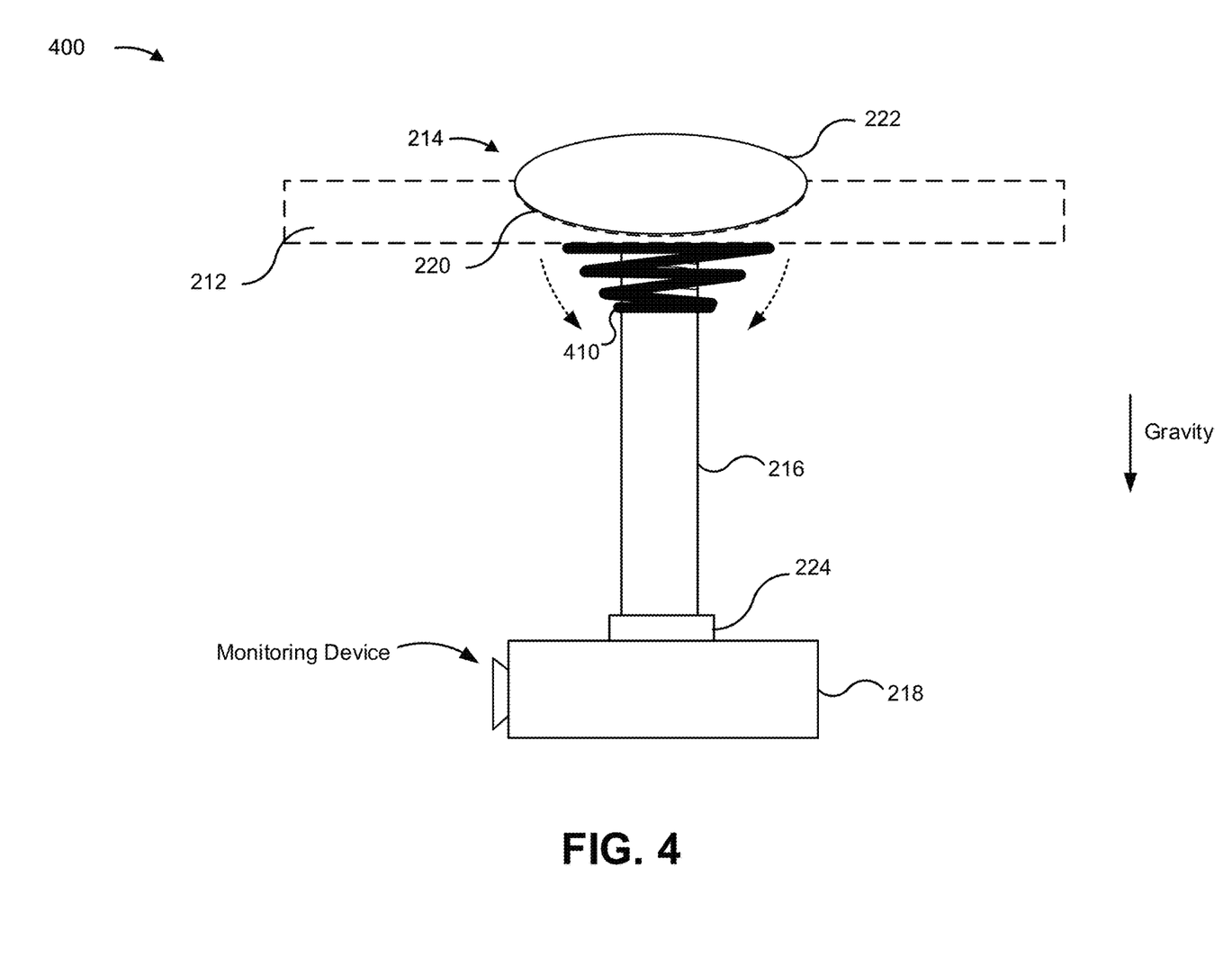
FIG. 4 is a diagram of an example implementation of a sensor stabilization system associated with the mount system of FIG. 2.

FIG. 4 is a diagram of an example implementation 400 associated with the mount system 200 of FIG. 2. In FIG. 4, a plan view of one or more components of a sensor stabilization system of the mount system 200 are shown. As shown, the sensor stabilization system may include the alignment coupling 214 (including the alignment cup and the oblong fitting 222), the extension arm 216, and a dampening component 410 that is between the support structure 212 and the extension arm 216. The dampening component 410 of FIG. 4 is shown as a conical spring, though other types of dampening components can similarly be included or used. The dampening component 410 may store potential energy to bias the extension arm 216 toward a vertical position (e.g., to be parallel with a gravitational force). In this way, the dampening component 410 may cause the extension arm 216 to return to vertical within a threshold period of time of being moved relative to the support structure 212 (e.g., due to an external force being applied to the device structure 218, extension arm 216, and/or the like). The duration of the threshold period of time may correspond to a desired amount of time within which the monitoring device is to obtain information associated with an environment after being moved from a monitoring location.

In some implementations, the dampening component 410 may be attached to the support structure 212 and configured to receive the extension arm 216 (e.g., without being attached to the extension arm 216). In this way, the potential energy of the conical spring is focused, from the support structure 212, toward the extension arm 216 to cause the extension arm 216 realign to vertical, while allowing rotation within the dampening component 410. According to some implementations, a similar dampening component 410 may be installed and/or attached between the extension arm 216 and the device structure 218 (e.g., e.g., over the coupling 224). In such a case, the extension arm 216 and device structure 218 may be biased toward being perpendicular to one another but allow some pivot about the coupling 224 to reduce damage to coupling 224 and/or return the device structure to the monitoring location within a threshold period of time of being removed from the monitoring location (or within a threshold period of time associated with the impact).

As indicated above, FIG. 4 is provided merely as one or more examples. Other examples may differ from what is described with regard to FIG. 4.

Figure 5:
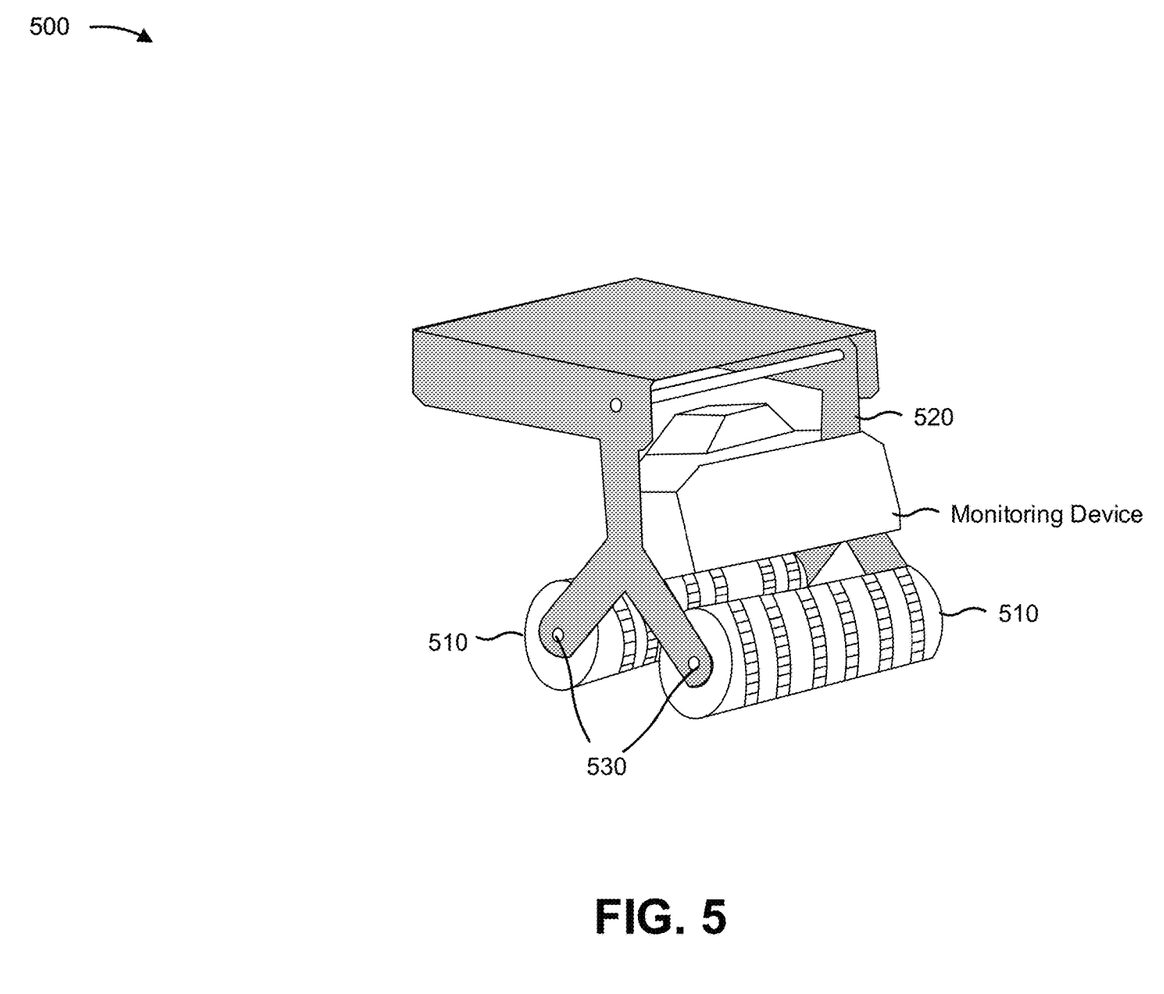
FIG. 5 is a diagram of an example implementation of one or more friction reduction components associated with the mount system of FIG. 2.

FIG. 5 is a diagram of an example implementation 500 associated with the mount system 200 of FIG. 2. In FIG. 5, an isometric view of one or more friction reduction components 510 is shown. As illustrated, the friction reduction components 510 may be attached to a device structure 520 (e.g., corresponding to the device structure 218 of the mount system 200) that supports, holds, and/or houses a monitoring device.

In the example implementation 500 of FIG. 5, the friction reduction components 510 are shown as rollers that rotate about connection points 530. The friction reduction components 510 reduce the potential for damage to the device structure 520 and/or the monitoring device during a collision with another object (e.g., the freight and/or forklift of FIG. 1), and correspondingly, improve the durability of the device structure 218 and/or the mount system 200. In some implementations, additional friction reduction components 510 may be included (e.g., to surround a perimeter of the device structure 520) to further reduce the potential for friction with a colliding object.

As indicated above, FIG. 5 is provided merely as one or more examples. Other examples may differ from what is described with regard to FIG. 5.

The foregoing disclosure provides illustration and description but is not intended to be exhaustive or to limit the implementations to the precise forms disclosed. Modifications and variations may be made in light of the above disclosure or may be acquired from practice of the implementations.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Some implementations are described herein to include a parallel relationship or a perpendicular relationship. As used herein, parallel is meant to cover substantially parallel and perpendicular is meant to cover substantially perpendicular. Further, as used herein, "substantially" refers to a described measurement, element, or relationship being within a tolerance (e.g., a design tolerance, a manufacturing tolerance, an industry standard tolerance, and/or the like).

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A mount system for a monitoring device configured to monitor an environment from a particular perspective, the mount system comprising:
   a support structure fixed to a support;
   an extension arm suspended from the support structure via an alignment coupling, wherein the alignment coupling comprises:
      an oblong fitting that is attached to an upper end of the extension arm; and
      an alignment cup within the support structure that is shaped to receive the oblong fitting which returns a device structure to a monitoring location by causing a monitoring axis of the device structure to align with a passageway of the environment based on meshing the alignment cup with the oblong fitting,
      wherein a base of the alignment cup includes a through-hole that receives the extension arm; and
   the device structure suspended from the extension arm opposite the alignment coupling and configured to house the monitoring device for monitoring,
   wherein the extension arm and alignment coupling are configured to:
      permit the device structure to move relative to the support structure when an external force is applied on one of the device structure and the extension arm, and
      return the device structure to the monitoring location that corresponds to the particular perspective.

2. The mount system of claim 1, wherein the support structure is configured to position the extension arm and the device structure within the monitoring location,
   wherein the monitoring location is based on an object detection range or resolution of the monitoring device.

3. The mount system of claim 1, wherein the extension arm has a length that causes a base of the device structure to be lower than an upper edge of a passageway of the environment, wherein the upper edge of the passageway is a static distance from a floor of the environment.

4. The mount system of claim 1, wherein the alignment cup and the oblong fitting are separable and shaped to enable the oblong fitting to become dislodged from the alignment cup when the external force is applied on one of the device structure and the extension arm.

5. The mount system of claim 4, wherein, when the oblong fitting is dislodged from the alignment cup, the alignment cup and the oblong fitting are shaped to permit a gravitational force to realign the monitoring axis with the passageway.

6. The mount system of claim 1, wherein the extension arm includes a dampening component that is biased, based on being engaged with the support structure, to maintain the device structure within the monitoring location.

7. The mount system of claim 1, wherein the device structure is attached to the extension arm via a flexible coupling that permits the device structure to pivot about a lower end of the extension arm.

8. The mount system of claim 1, wherein the device structure includes a friction reduction component to reduce friction between the device structure and an interfering object that applies a force on the friction reduction component.

9. A monitoring system comprising:
   a monitoring device configured to determine or provide information associated with an environment that is within a field of view of the monitoring device;
   a device structure that houses the monitoring device; and
   a sensor stabilization system to:
      suspend the device structure from a support structure that is associated with the environment, and
      bias the monitoring device toward a monitoring location;
   wherein the sensor stabilization system comprises:
      an extension arm having a lower end and an upper end, wherein the lower end is attached to the device structure and the upper end is attached to an oblong fitting; and
      an alignment cup coupled with the support structure, wherein the alignment cup is shaped to receive the oblong fitting, and
      wherein the extension arm is received through a through-hole at a base of the alignment cup.

10. The monitoring system of claim 9, wherein the oblong fitting and the extension arm include a conduit to receive wiring associated with the monitoring device.

11. The monitoring system of claim 9, wherein the sensor stabilization system includes a dampening component between the support structure and the extension arm,
   wherein the dampening component is configured to dampen movement between the support structure and the extension arm.

12. The monitoring system of claim 9, wherein the field of view of the monitoring device, when the device structure is within the monitoring location, includes an opening of a container in the environment such that the monitoring device obtains information associated with the container.

13. A stabilization system to stabilize a monitoring device, the stabilization system comprising:
   an extension arm attached to a device structure for housing the monitoring device;
   an alignment coupling comprising:
      an alignment cup coupled to a support structure,
         wherein the extension arm is received through a through-hole in the alignment cup, and
      an oblong fitting attached to the extension arm opposite the device structure,
         wherein the oblong fitting is complementarily shaped to be received within the alignment cup, such that when the oblong fitting is received within the alignment cup, the device structure is aligned into a monitoring location; and
   a dampening component between the support structure and the extension arm to bias the device structure into the monitoring location.

14. The stabilization system of claim 13, wherein the alignment cup has an oblong shape that corresponds to a shape of the oblong fitting,
   wherein a longitudinal axis of the oblong fitting is aligned with a longitudinal axis of the alignment cup when the device structure is in the monitoring location.

15. The stabilization system of claim 13, wherein the dampening component is configured to cause the extension arm to remain within a threshold range of being perpendicular to the alignment cup.

16. The stabilization system of claim 13, wherein the dampening component is a first dampening component and the stabilization system further includes:

a second dampening component between the extension arm and the device structure to bias the device structure into the monitoring location.

17. The stabilization system of claim 13, wherein at least a portion of the stabilization system is configured to be suspended within a high traffic zone of a loading bay, and wherein the stabilization system is configured to return the device structure to the monitoring location within a period of time following an impact from an object.

18. A mount system for a monitoring device configured to monitor an environment from a particular perspective, the mount system comprising:
a support structure fixed to a support;
an extension arm suspended from the support structure via an alignment coupling; and
a device structure suspended from the extension arm opposite the alignment coupling and configured to house the monitoring device for monitoring, the device structure comprising a friction reduction component to reduce friction between the device structure and an interfering object that applies a force on the friction reduction component,
wherein the extension arm and alignment coupling are configured to:
permit the device structure to move relative to the support structure when an external force is applied on one of the device structure and the extension arm, and
return the device structure to a monitoring location that corresponds to the particular perspective.

19. The mount system of claim 18, wherein the friction reduction component comprises a set of rollers.

\* \* \* \* \*